(12) United States Patent
Kulesha

(10) Patent No.: US 8,074,929 B1
(45) Date of Patent: Dec. 13, 2011

(54) METHODS AND SYSTEMS FOR COMPOSITE STRUCTURAL TRUSS

(75) Inventor: Richard L. Kulesha, Bear, DE (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/094,240

(22) Filed: Apr. 26, 2011

Related U.S. Application Data

(62) Division of application No. 11/696,793, filed on Apr. 5, 2007, now Pat. No. 7,954,763.

(51) Int. Cl.
*B64C 1/00* (2006.01)
(52) U.S. Cl. .................................. 244/123.1
(58) Field of Classification Search ............... 244/123.1
See application file for complete search history.

(56) References Cited

U.S. PATENT DOCUMENTS

| | | | |
|---|---|---|---|
| 582,527 A | 5/1897 | Golden | |
| 1,429,600 A | 9/1922 | Lundin | |
| 2,233,969 A | 3/1941 | Woods | |
| 2,589,193 A | 3/1952 | Mayne | |
| 3,901,465 A | 8/1975 | DeAngelis | |
| 3,973,766 A | 8/1976 | Heath | |
| 4,078,352 A | 3/1978 | Knowles | |
| 4,120,065 A | 10/1978 | Sivachenko et al. | |
| 4,481,703 A | 11/1984 | Scott | |
| 5,332,178 A | 7/1994 | Williams | |
| 5,632,940 A | 5/1997 | Whatley | |
| 5,993,941 A | 11/1999 | Vasiliev et al. | |
| 6,427,945 B1 | 8/2002 | Banesmir | |
| 6,502,788 B2 | 1/2003 | Noda et al. | |
| 2006/0032702 A1 | 2/2006 | Linsmeier et al. | |
| 2006/0145031 A1 | 7/2006 | Ishikawa et al. | |

OTHER PUBLICATIONS

MIRA Flies High Using Composite Wing Ribs; SAE-UK.org Winter 2006 Issue; 3 pages.
Black, S.; Composite Rib Structure for Airbus A380 Vertical tail; Mar. 2004; 4 pages.
Halme, J.; Development Testing of a Composite Wing Rib; Abstract of the Master's Thesis; May 6, 2002; Helsinki University of Technology; 134 pages.
International Search Report and Written Opinion of PCT/US2008/058796; Jan. 7, 2009; 14 pages.
Vasiliev, V. et al.; Anisogrid Composite Lattice Structures for Spacecraft and Aircraft Application; Composite Structures; 2006; pp. 182-189; vol. 76.
Vasiliev, V. et al.; Filament-Wound Anisogrid Lattice Shear Beams for Airframe Structures; Proceedings of the International Syposium of Manufacturing Technology for Composite Aircraft; Jan. 1, 2004; pp. 1-4.

*Primary Examiner* — Tien Dinh
*Assistant Examiner* — Justin Benedik
(74) *Attorney, Agent, or Firm* — Armstrong Teasdale LLP

(57) ABSTRACT

Methods and structures for a composite truss structure are provided. The structure includes an upper chord member, a lower chord member, and a plurality of web members extending therebetween. Each of the upper chord member, the lower chord member, and the plurality of web members are formed of a continuous composite fiber positioned in each of the upper chord member, the lower chord member, and each of the plurality of web members wherein each of the upper chord member, the lower chord member, and the plurality of web members includes a predetermined number of passes of the continuous composite fiber corresponding to a predetermined load. The composite truss structure also includes at least a first gusseting plate coupled to the upper chord member, the lower chord member, and the plurality of web members.

10 Claims, 4 Drawing Sheets

# METHODS AND SYSTEMS FOR COMPOSITE STRUCTURAL TRUSS

CROSS-REFERENCE TO RELATED APPLICATIONS

This application is a divisional application of U.S. patent application Ser. No. 11/696,793, filed Apr. 5, 2007, now U.S. Pat. No. 7,954,763 entitled "METHODS AND SYSTEMS FOR COMPOSITE STRUCTURAL TRUSS", the disclosure of which is hereby incorporated herein by reference in its entirety.

BACKGROUND

Embodiments of the disclosure relate generally to methods and structures for forming lightweight truss members and more particularly, to methods and structures for forming composite wing rib and fuselage truss members.

Conventional aircraft wing construction generally comprises one or more spars that extend laterally relative to the longitudinal axis of the fuselage to support a plurality of longitudinally extending laterally spaced ribs that define the shape of the air foil. Vertical web portions of the ribs include structural elements configured to carry compressive and tensile loads to maintain the airfoil shape. A truss design for aircraft wing ribs is an efficient method of transferring and distributing loads throughout the wing structure. Additionally truss structures are used for bridges, floors and other supporting structures. At least some known truss structures are heavy due to the use of metal components and structural elements of the truss structure. A lightweight material may be used to make strong lightweight truss structures however, current composite ribs are complicated to manufacture and generally heavy in order to provide sufficient load transfer between the truss structural elements. The assembly of aircraft wings utilizing composite ribs in the wing have also proven to be difficult.

What are needed are methods and structures for providing lightweight support structures that facilitate fabrication of the truss structures and connecting components and reduce assembly time.

SUMMARY

In one embodiment, a composite truss structure includes an upper chord member, a lower chord member, and a plurality of web members extending there between. Each of the upper chord member, the lower chord member, and the plurality of web members are formed of a continuous composite fiber positioned in each of the upper chord member, the lower chord member, and each of the plurality of web members wherein each of the upper chord member, the lower chord member, and the plurality of web members includes a predetermined number of passes of the continuous composite fiber corresponding to a predetermined load. The composite truss structure also includes at least a first gusseting plate coupled to the upper chord member, the lower chord member, and the plurality of web members.

In another embodiment, a method of forming a composite structural member includes forming a profile of the structural member wherein the profile includes a channel representing interconnected structural elements, winding a continuous fiber through the channel a predetermined number of passes through each structural element based on a strength requirement of each respective structural element, and coupling at least one gusseting plate to the interconnected structural elements.

In yet another embodiment, a method of forming an aircraft wing including a composite wing rib includes forming a wing rib including a plurality of interconnected structural elements using a continuous epoxy impregnated fiber positioned a predetermined number of passes in each structural element wherein the number of passes is based on a strength requirement of each respective structural element. The method also includes coupling a gusseting plate to a side of the interconnected structural elements, assembling at least one wing rib to a forward spar and an aft spar, assembling a trailing edge skin to the spar and wing rib assembly, assembling an upper and a lower center skin to the rib, spar and trailing edge skin assembly such that the center skins overlap the trailing edge skin, and attaching the leading edge skin to the wing assembly such that the leading edge skin overlaps the center skin and trailing edge skin assembly.

DETAILED DESCRIPTION

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
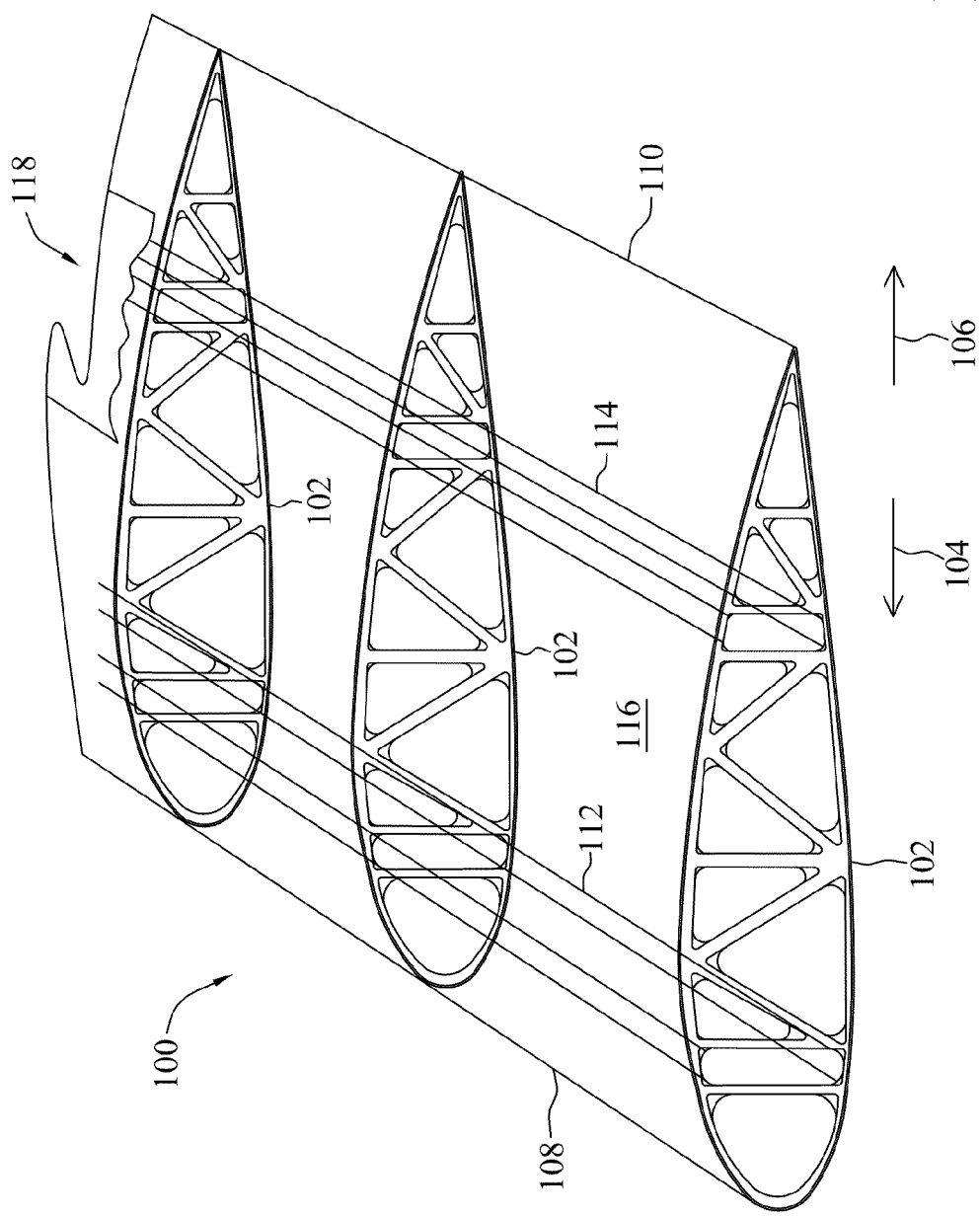
FIG. 1 is a cut-away isometric view of an aircraft wing structure in accordance with an embodiment of the disclosure.

FIG. 1 is a cut-away isometric view of an aircraft wing structure 100 in accordance with an embodiment of the disclosure. In the exemplary embodiment, aircraft wing structure 100 includes a plurality of truss rib assemblies 102 extending in a forward direction 104 and an aft direction 106 between a leading edge 108 and a trailing edge 110 of aircraft wing structure 100. Aircraft wing structure 100 also includes a forward wing spar 112 and an aft wing spar 114 extending from a fuselage of the aircraft (not shown). A lower wing skin 116 is joined to lower portions of truss rib assemblies 102 between leading edge 108 and trailing edge 110. Similarly, an upper wing skin 118 is bonded to upper portions of truss ribs 102 between leading edge 108 and trailing edge 110.

Figure 2:
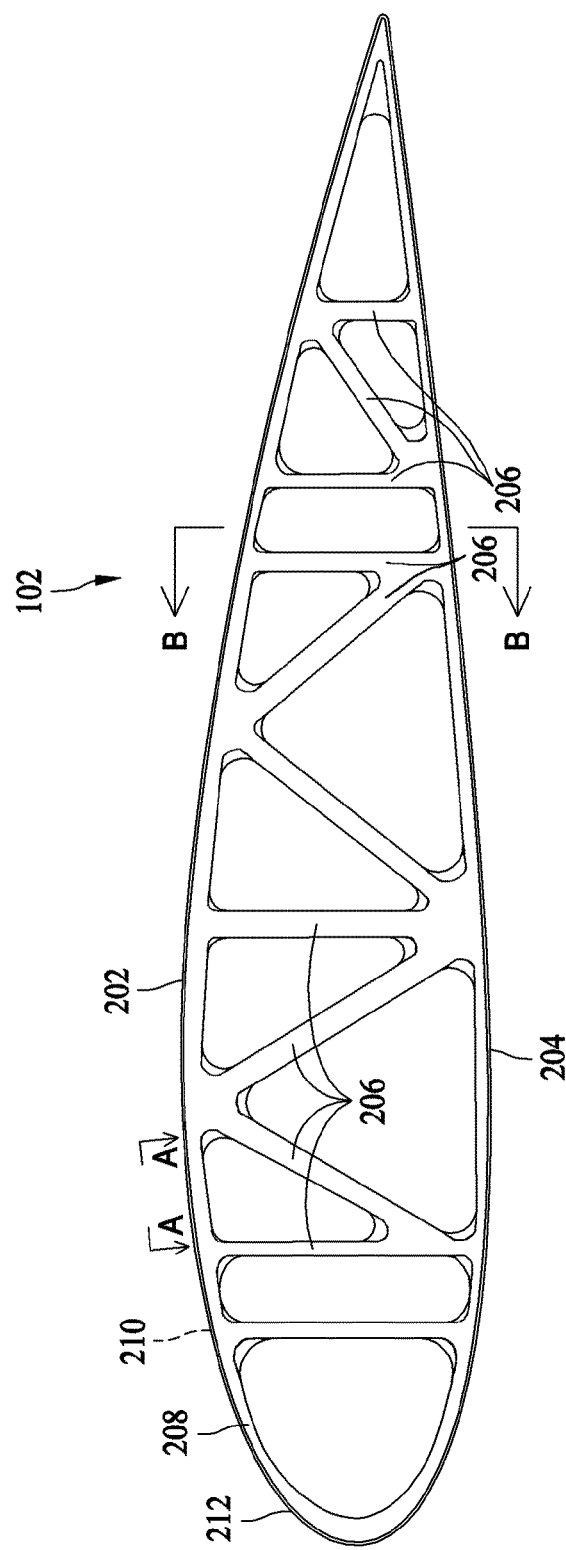
FIG. 2 is a side cross-sectional view of a truss rib assembly in accordance with an exemplary embodiment of the disclosure.

FIG. 2 is a side cross-sectional view of a truss rib assembly 102 in accordance with an exemplary embodiment of the disclosure. Although described as a rib for an aircraft airfoil such as a wing, it should be understood that the structures and methods of fabricating such structures may be used for other composite truss structures, for example, but not limited to joists, roof trusses, and bridge deck support members. In the exemplary embodiment, truss rib assembly 102 comprises a composite truss structure. Truss rib assembly 102 includes an upper chord member 202, a lower chord member, 204, and a plurality of web members 206 extending therebetween. Upper chord member 202, lower chord member, 204, and web members 206 are formed of continuous composite fiber wound through each of upper chord member 202, lower chord member 204, and web members 206. A number of passes or turns of the continuous composite fiber that are channeled through each member is determined based on a strength requirement of each member and based on the strength capability of each continuous composite fiber and the strength capability of the determined number of continuous composite fibers channeled through each member. The continuous composite fiber may comprise, but is not limited to a carbon fiber, a fiber glass fiber, an aromatic polyamide fiber such as Aramid, other fiber filaments or combinations thereof. The continuous composite fiber may also comprise, but is not limited to, a tow, or a web comprising the above materials. The fiber, web or tow may be impregnated with an adhesive, a thermoplastic or a thermoset.

In the exemplary embodiment, upper chord member 202 and lower chord member 204 are joined at leading edge 108 and trailing edge 110. In an alternative embodiment, upper chord member 202, lower chord member 204 are not joined directly and may be joined through web member 206 extending between upper chord member 202 spaced apart from lower chord member 204.

Truss rib assembly 102 also includes a first rib side or gusseting plate 208 coupled to upper chord member 202, lower chord member 204, and web members 206, and a second rib side or gusseting plate 210 (not visible on the backside of truss rib 102 in FIG. 2) coupled to a side of upper chord member 202, lower chord member, 204, and web members 206 opposite from first gusseting plate 208. First gusseting plate 208 and second gusseting plate 210 sandwich upper chord member 202, lower chord member 204, and web members 206 therebetween. First gusseting plate 208 and second gusseting plate 210 may also include a flange 212 extending away from an outer peripheral edge 214 of the respective gusseting plate 208 and 210. Flange 212 increase a stiffness of truss rib assembly 102 and provides a coupling location for attaching lower wing skin 116 and upper wing skin 118 (both shown in FIG. 1). After gusseting plates 208 and 210 are attached to truss rib assembly 102, gusseting plates 208 and 210 are routed or machined to open up the webs of gusseting plates 208 and 210 to conform a profile of gusseting plates 208 and 210 to a profile of upper chord member 202, lower chord member 204, and web members 206 and to reduce the weight of truss rib assembly 102.

During fabrication, a form in a predetermined shape of truss rib assembly 102 is formed using a channeled frame. A continuous fiber generally of a composite material such as carbon filament is wound through the channel a predetermined number of passes through each structural element based on a strength requirement of each respective structural element. The continuous fiber may include, but is not limited to fibers, filaments, webs, and tapes including carbon or other material. The fibers, filaments, webs, and tapes may also be impregnated with an adhesive, thermoplastic, or thermoset such as for example an epoxy. The fiber is wound through the channels representing the various structural elements forming truss rib assembly 102. More passes of the fiber through a structural elements generally permits that structural element to withstand greater load. The load carrying requirement of each structural element is determined and this requirement is associated with a number of turns or passes to achieve that load carrying capability.

One or both of gusseting plates 208 and 210 are coupled to a side of truss rib assembly 102 to provide additional stiffness and an attachment means for, for example, a skin of the airfoil or deck of a bridge.

As described above, truss rib assembly 102 is a composite rib that is fiber placed with side plates co-bonded, bonded or consolidated, if thermoplastic, to the side of the rib. A continuous fiber is placed down following and outlining the rib mold line and the truss structural members. This process is continued until the rib is of sufficient thickness to carry the appropriate wing design loads. The fiber placement of the ribs allows each rib to be tailored optimizing the structural design and reducing the weight of the wing assembly. The side plates are then added, one to each side of the rib to act as gussets at the junction of each of the truss structural elements. After the side plates are attached to the center rib structure the side plates are machined to open up the side plate webs and reduce the weight. Truss rib assembly 102 is illustrated as if manufactured as a complete truss rib assembly 102 but the option exists to manufacture truss rib assembly 102 in more than one piece to facilitate different wing assembly methods. The flanges shown at the spar and cap locations are to bond the rib and or rib sections to the individual skins to form skin assemblies and then bond the subassemblies into a completed wing. The use of the composite truss ribs are not limited to aircraft wings, but also to floor or roof trusses on buildings, and bridge trusses that are manufactured in different locations and are erected on site. The light weight truss simplifies handling with less or smaller support equipment.

Figure 3:
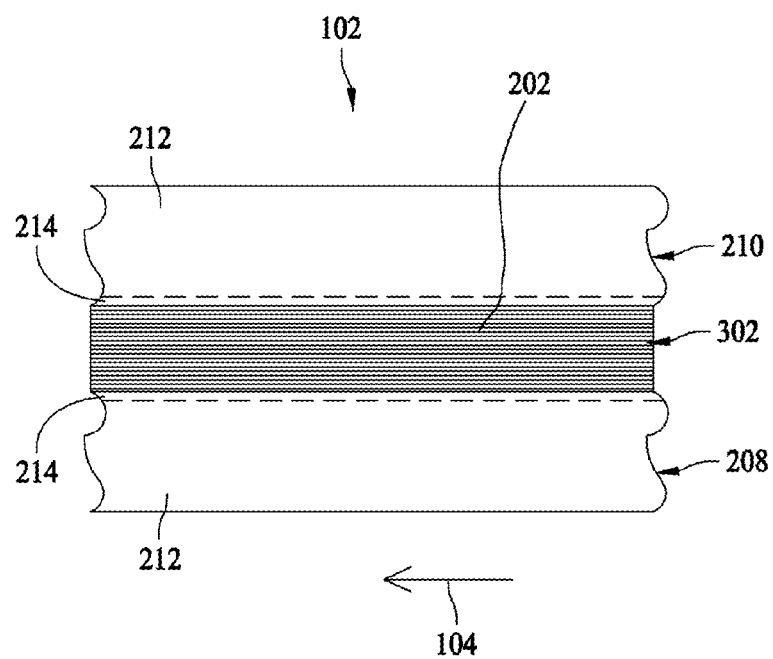
FIG. 3 is a section view of the truss rib assembly shown in FIG. 2 taken along section lines A-A.

FIG. 3 is a section view of truss rib assembly 102 taken along section lines A-A (shown in FIG. 2). In the exemplary embodiment, truss rib assembly 102 is formed by a plurality of passes or turns of a continuous fiber 302 wound about a form or frame to the shape of the desired truss rib assembly 102. The passes of fiber are substantially unidirectional and are adhered or bonded together to form a rigid truss comprising upper chord 202, of which only a portion is shown in FIG. 3.

Figure 4:
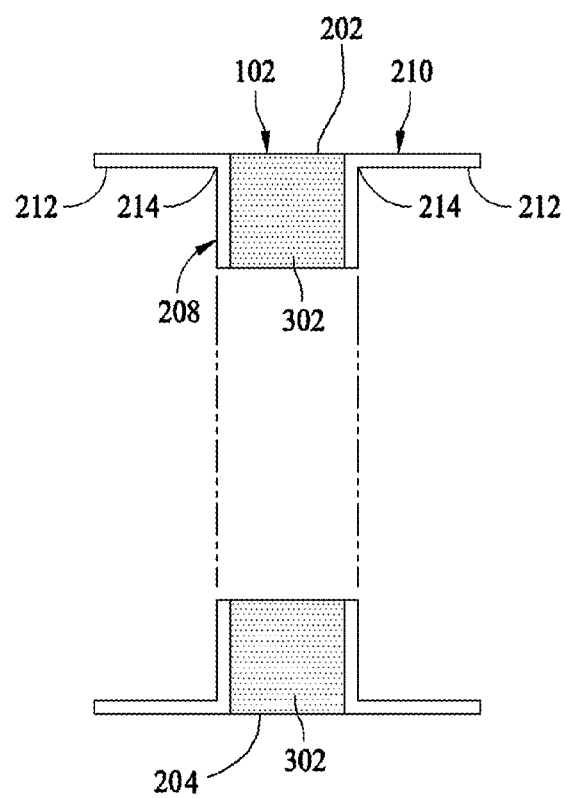
FIG. 4 is a section view of the truss rib assembly shown in FIG. 2 taken along section lines B-B.

FIG. 4 is a section view of truss rib assembly 102 taken along section lines B-B (shown in FIG. 2). In the exemplary embodiment, truss rib assembly 102 is formed by a plurality of passes or turns of a continuous fiber 302 wound about a form or frame to the shape of the desired truss rib assembly 102. The passes of fiber are substantially unidirectional and are adhered or bonded together to form a rigid truss comprising upper chord 202 and lower chord 204, of which only a portion of each is shown in FIG. 4.

Figure 5:
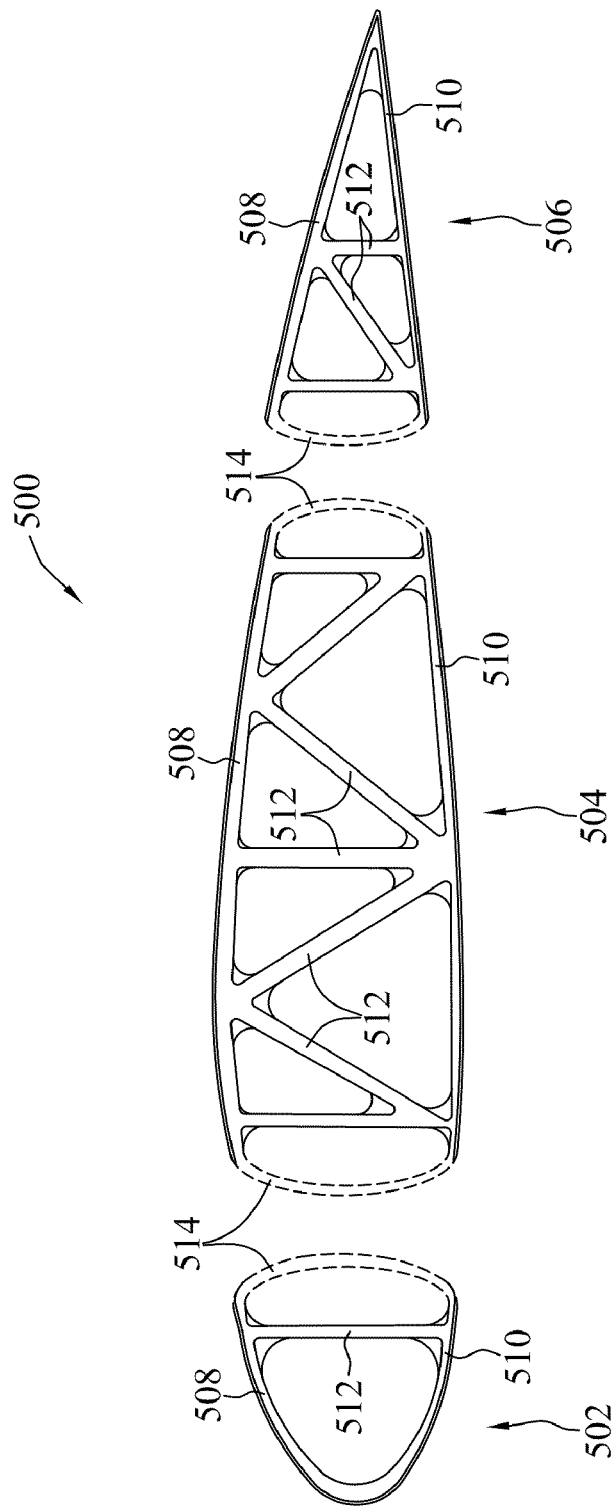
FIG. 5 is a side cross-sectional view of a truss rib assembly 500 in accordance with another exemplary embodiment of the disclosure.

FIG. 5 is a side cross-sectional view of a truss rib assembly 500 in accordance with another exemplary embodiment of the disclosure. In the exemplary embodiment, truss rib assembly 500 is fabricated in three portions, a forward portion 502, a center portion 504, and an aft portion 506. Each portion is formed of a continuous fiber wound in channels oriented in a pattern representing a respective portion of an upper chord 508, a lower chord 510, and interconnecting structural members 512 forming the truss web. Each portion includes at least one fabrication channel 514 coupled to a distal end of respective portions of upper chord 508 and lower chord 510. Fabrication channel 514 permits winding a continuous fiber through all members of forward portion 502, a center portion 504, and an aft portion 506 during fabrication. Fabrication channel 514 is removed from forward portion 502, a center portion 504, and an aft portion 506 after formation of forward portion 502, a center portion 504, and an aft portion 506 is complete and further assembly is accomplished by joining forward portion 502, a center portion 504, and an aft portion 506. In one embodiment, forward portion 502 and center portion 504 are assembled to a forward spar (not shown) prior to being joined to each other and center portion 504 and an aft portion 506 are assembled to a rear spar (not shown) prior to being joined to each other.

The above-described methods of forming composite structural members and composite truss structures formed thereby are cost-effective and highly reliable. The methods and structures include a continuous fiber wound through a plurality of structural elements to form the member. The fiber is placed such that it is substantially unidirectional along a longitudinal axis in each of the elements to provide lightweight compressive and tensile strength to the member. Accordingly, the methods and structures facilitate reducing weight and fabrication time, and improving strength and stiffness of the structural member in a cost-effective and reliable manner.

While embodiments of the disclosure have been described in terms of various specific embodiments, those skilled in the art will recognize that the embodiments of the disclosure can be practiced with modification within the spirit and scope of the claims.

What is claimed is:

1. A method of forming a composite aircraft structural member comprising:
   forming a profile of the aircraft structural member wherein the profile includes a channel representing interconnected structural elements;
   winding at least one continuous fiber through the channel a predetermined number of passes through each structural element based on a strength requirement of each respective structural element; and
   curing the fiber within the channel to complete the composite aircraft structural member; and
   coupling at least one gusseting plate having substantially the same profile of said interconnected structural elements to a side of said interconnected structural elements.

2. A method in accordance with claim 1 further comprising coupling a first gusseting plate to a first side of said interconnected structural elements and a second gusseting plate to a second side of said interconnected structural elements, the second side opposite the first side.

3. A method in accordance with claim 2 wherein coupling a first and a second gusseting plate comprises coupling at least one gusseting plate that includes a flange extending away from an edge of a respective one of the gusseting plates.

4. A method in accordance with claim 2 wherein coupling a first and a second gusseting plate comprises coupling at least one gusseting plate having a profile that is substantially complementary to a profile of the interconnected structural elements.

5. A method in accordance with claim 1 wherein forming a profile of the structural member comprises forming a profile that includes channels representing at least one of a vertical web member, a horizontal web member, and a diagonal web member.

6. A method in accordance with claim 1 wherein winding a continuous fiber through the channel comprises winding at least one of an epoxy impregnated carbon filament, an epoxy impregnated carbon tow, and an epoxy impregnated carbon web through the channel to form the structural elements.

7. A method in accordance with claim 1 wherein forming a profile of the structural member comprises forming a profile of the structural member that includes a channel representing an upper chord member and a lower chord member wherein a first end of the upper chord member is coupled to a first end of the lower chord member and a second end of the upper chord member is coupled to a second end of the lower chord member.

8. A method in accordance with claim 1 wherein forming a profile of the structural member comprises forming a plurality of profiles of separate portions of the structural member, said method further comprising coupling each separate portion to another separate to form the structural member.

9. A method of forming an aircraft wing including a composite wing rib, said method comprising:
   forming a wing rib including a plurality of interconnected structural elements using at least one continuous epoxy impregnated fiber positioned a predetermined number of passes in
   each structural element, the number of passes based on a strength requirement of each respective structural element;
   coupling at least one gusseting plate having substantially the same profile of said interconnected structural elements to a side of said interconnected structural elements;
   assembling at least one wing rib to a forward spar and an aft spar;
   assembling a trailing edge skin to the spar and wing rib assembly;
   assembling an upper and a lower center skin to the rib, spar and trailing edge skin assembly such that the center skins overlap the trailing edge skin; and
   attaching the leading edge skin to the wing assembly such that the leading edge skin overlaps the center skin and trailing edge skin assembly.

10. A method according to claim 9 wherein forming a wing rib including a plurality of interconnected structural elements comprises forming an upper chord member, a lower chord member, and a plurality of web members extending between the chord members.

* * * * *